United States Patent [19]
Schwarz

[11] Patent Number: 5,976,231
[45] Date of Patent: Nov. 2, 1999

[54] INKS FOR INK JET PRINTING

[75] Inventor: William M. Schwarz, Webster, N.Y.

[73] Assignee: Xerox Corporation, Stamford, Conn.

[21] Appl. No.: 09/106,527

[22] Filed: Jun. 29, 1998

[51] Int. Cl.⁶ .................................................. C09D 11/02
[52] U.S. Cl. ..................................... 106/31.43; 106/31.75
[58] Field of Search .............................. 106/31.43, 31.75

[56] References Cited

U.S. PATENT DOCUMENTS

| | | | |
|---|---|---|---|
| 3,985,663 | 10/1976 | Lu et al. | 106/31.32 |
| 4,554,555 | 11/1985 | Aruga et al. | 106/31.43 |
| 4,576,649 | 3/1986 | Oliver et al. | 106/31.75 |
| 4,680,057 | 7/1987 | Hays | 106/31.79 |
| 4,822,419 | 4/1989 | Pepoy et al. | 106/31.43 |
| 5,019,166 | 5/1991 | Schwarz | 106/31.43 |
| 5,254,159 | 10/1993 | Gundlach et al. | 106/31.43 |
| 5,320,902 | 6/1994 | Malhotra et al. | 428/342 |
| 5,389,133 | 2/1995 | Gundlach et al. | 106/31.43 |
| 5,403,358 | 4/1995 | Aston et al. | 8/445 |
| 5,730,789 | 3/1998 | Botros | 106/31.43 |

*Primary Examiner*—Helene Klemanski
*Attorney, Agent, or Firm*—Judith L. Byorick

[57] ABSTRACT

Disclosed is an ink composition which comprises water, an anionic dye, and a monoquaternary cationic penetrant of the formula

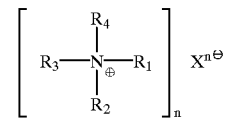

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Also disclosed is a set of inks for generating multicolored images which comprises (a) a first ink as described above; and (b) a second ink comprising water and a pigment; wherein intercolor bleed between the first ink and the second ink is reduced. Further disclosed are ink jet printing processes with the ink and ink set described above.

26 Claims, No Drawings

INKS FOR INK JET PRINTING

BACKGROUND OF THE INVENTION

The present invention is directed to inks and to methods for the use thereof. More specifically, the present invention is directed to inks and ink sets for use in ink jet printing processes, wherein intercolor bleed between the inks is reduced. One embodiment of the present invention is directed to an ink composition which comprises water, an anionic dye, and a monoquaternary cationic penetrant of the formula

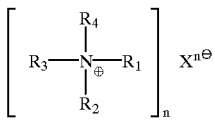

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Another embodiment of the present invention is directed to a process which comprises applying an ink composition which comprises water, an anionic dye, and a monoquaternary cationic penetrant of the formula

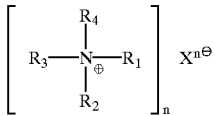

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, to a plain paper substrate, wherein the ink exhibits rapid penetration of the substrate. Yet another embodiment of the present invention is directed to a set of inks for generating multicolored images which comprises (a) a first ink comprising water, an anionic dye, and a monoquaternary cationic penetrant of the formula

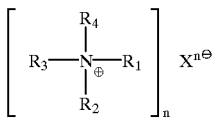

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion; and (b) a second ink comprising water and a pigment; wherein intercolor bleed between the first ink and the second ink is reduced. Still another embodiment of the present invention is directed to a process for generating multicolored images on a recording sheet which comprises (a) providing a first ink comprising water, an anionic dye, and a monoquaternary cationic penetrant of the formula

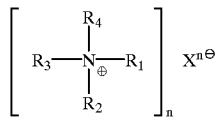

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion; (b) providing a second ink comprising water and a pigment; (c) applying the first ink to the recording sheet; and (d) applying the second ink to the recording sheet; wherein the first ink is in contact with the second ink on the recording sheet, and wherein intercolor bleed between the first ink and the second ink is reduced.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Acoustic ink jet printing processes are also known. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," *IBM Technical Disclosure Bulletin,* Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also has been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.,* vol. 65, no. 9 (1 May 1989) and references therein, the disclosure of which is totally incorporated herein by reference.

U.S. Pat. No. 5,019,166 (Schwarz), the disclosure of which is totally incorporated herein by reference, discloses a thermal ink jet printing composition comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof. Also disclosed is a process for generating images which comprises causing the ink compositions disclosed herein to be ejected from a thermal ink jet printer in imagewise fashion onto a substrate.

Copending application U.S. Ser. No. 09/046,895, filed Mar. 24, 1998, entitled "Ink Compositions and Multicolor Thermal Ink Jet Printing Process for the Production of High Quality Images," with the named inventor John Wei-Ping Lin, the disclosure of which is totally incorporated herein by reference, discloses a set of inks for printing multicolor images in an ink jet printer, said ink set comprising (A) a first ink having a first color and comprising water and a colorant selected from the group consisting of (1) anionic dyes, (2) dyes having physical or chemically associated therewith a stabilizing agent having anionic groups thereon, (3) pigment particles having anionic groups chemically attached thereto, (4) pigment particles having physically or chemically associated therewith a stabilizing agent having anionic groups thereon, and (5) mixtures thereof; and (B) a second ink comprising water, an optional colorant having a color other than the first color, and an ammonium salt having at least two cationic ammonium functional groups, wherein the colorant in the first ink is capable of being immobilized on a printing substrate by interaction with the ammonium salt having at least two cationic ammonium functional groups in the second ink.

Copending application U.S. Ser. No. 09/047,097, filed Mar. 24, 1998, entitled "Ink Compositions With Improved Waterfastness and Smear Resistance," with the named inventors Kurt B. Gundlach, Richard L. Colt, Luis A. Sanchez, Maura A. Sweeney, and Edward J. Radigan, Jr., the disclosure of which is totally incorporated herein by reference, discloses an ink composition which comprises water, an anionic dye, and a polyquaternary amine compound selected from the group consisting of polydiallyl dimethyl ammonium compounds, polyquaternized polyvinylamines, polyquaternized polyallylamines, and mixtures thereof. Also disclosed are methods for using the aforementioned ink composition in ink jet printing processes.

Copending application U.S. Ser. No. 09/046,852, filed Mar. 24, 1998, entitled "Ink Compositions With Improved Shelf Stability", with the named inventors Kurt B. Gundlach, Luis A. Sanchez, Richard L. Colt, Maura A. Sweeney, and William M. Schwarz, the disclosure of which is totally incorporated herein by reference, discloses an ink composition which comprises (1) water; (2) a nonpolymeric salt comprising at least one cation and at least one anion; and (3) a colorant comprising an anionic dye complexed with a polyquaternary amine compound. Also disclosed is an ink composition which comprises (1) water; (2) a nonpolymeric salt comprising at least one cation and at least one anion; (3) an anionic dye; and (4) a polyquaternary amine compound. In one embodiment, the polyquaternary amine compound is selected from the group consisting of polydiallyl dimethyl ammonium compounds, polyquaternized polyvinylamines, polyquaternized polyallylamines, epichlorohydrin/amine copolymers, cationic amido amine copolymers, copolymers of vinyl pyrrolidinone and a vinyl imidazolium salt, and mixtures thereof.

Copending application U.S. Ser. No. 09/046,849, filed Mar. 24, 1998, entitled "Ink Compositions Containing Cationic Amido Amine Polymers", with the named inventor William M. Schwarz, the disclosure of which is totally incorporated herein by reference, discloses an ink composition which comprises (1) water; (2) a dye; and (3) a cationic amido amine copolymer. Also disclosed are methods for using the aforementioned ink composition in ink jet printing processes.

Copending application U.S. Ser. No. 09/047,278, filed Mar. 24, 1998, entitled "Ink Compositions Containing Vinyl Pyrrolidinone/Vinyl Imidazolium Copolymers", with the named inventor William M. Schwarz, the disclosure of which is totally incorporated herein by reference, discloses an ink composition which comprises (1) water; (2) an anionic dye; and (3) a copolymer of vinyl pyrrolidinone and a vinyl imidazolium salt. Also disclosed are methods for using the aforementioned ink compositions in ink jet printing processes.

Copending application U.S. Ser. No. 09/106,391; entitled "Ink Compositions Containing Oxy Acids or Oxy Acid Salts," with the named inventor William M. Schwarz, filed concurrently herewith, the disclosure of which is totally incorporated herein by reference, discloses an ink composition which comprises (1) water; (2) a colorant; and (3) an additive selected from the group consisting of oxy acids, oxy acid salts, and mixtures thereof. Also disclosed is a thermal ink jet printing process employing the ink.

Copending application U.S. Ser. No. 09/106,396; entitled "Ink Compositions Containing Ionic Liquid Solvents," with the named inventor William M. Schwarz, filed concurrently herewith, the disclosure of which is totally incorporated herein by reference, discloses an ink composition which comprises water, a colorant, and an ionic liquid material. In a preferred embodiment, the ink is substantially free of organic solvents. Also disclosed is a process which comprises incorporating the ink composition into an ink jet printing apparatus and causing droplets of the ink composition to be ejected in an imagewise pattern onto a substrate.

Copending application U.S. Ser. No. 09/106,621; entitled "Ink Compositions Substantially Free of Organic Liquids," with the named inventors Kurt B. Gundlach, Maura A. Sweeney, Luis A. Sanchez, Richard L. Colt, and Melvin D. Croucher, filed concurrently herewith, the disclosure of which is totally incorporated herein by reference, discloses an ink composition which comprises water, an acid dye, a monovalent salt, a polyquaternary amine compound, and an optional surfactant, said ink being substantially free of organic solvents. The ink is particularly suitable for applications such as ink jet printing and marking pens. The disclosed inks in some embodiments are substantially indelible. Also disclosed is a composition for removing the ink compositions from substrates to which they have been applied which comprises water and a dianionic surfactant, optionally further containing a salt, urea, and/or a viscosity building agent such as a gum.

While known compositions and processes are suitable for their intended purposes, a need remains for improved ink compositions for ink jet printing. In addition, a need remains for ink compositions which exhibit reduced intercolor bleed when printed adjacent to each other or on top of each other. Further, a need remains for ink compositions which exhibit reduced edge raggedness, feathering, and MFLEN, particularly when printed on plain paper. Additionally, a need remains for inks with desirable substrate penetrating characteristics. There is also a need for inks which exhibit reduced wet and dry smear characteristics. In addition, there is a need for ink compositions with good waterfastness characteristics. Further, there is a need for ink compositions with desirable substrate wetting characteristics.

SUMMARY OF THE INVENTION

It is an object of the present invention to provide ink compositions with the above noted advantages.

It is another object of the present invention to provide improved ink compositions for ink jet printing.

It is yet another object of the present invention to provide ink compositions which exhibit reduced intercolor bleed when printed adjacent to each other or on top of each other.

It is still another object of the present invention to provide ink compositions which exhibit reduced edge raggedness and MFLEN, particularly when printed on plain paper.

Another object of the present invention is to provide inks with desirable substrate penetrating characteristics.

Yet another object of the present invention is to provide inks which exhibit reduced wet and dry smear characteristics.

Still another object of the present invention is to provide ink compositions with good waterfastness characteristics.

It is another object of the present invention to provide ink compositions with desirable substrate wetting characteristics.

These and other objects of the present invention (or specific embodiments thereof) can be achieved by providing an ink composition which comprises wafer, an anionic dye, and a monoquaternary cationic penetrant of the formula

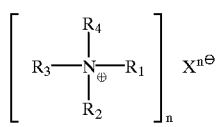

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper. Another embodiment of the present invention is directed to a process which comprises applying an ink composition which comprises water, an anionic dye, and a monoquaternary cationic penetrant of the formula

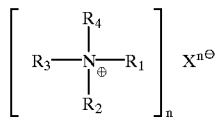

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, to a plain paper substrate, wherein the ink exhibits rapid penetration of the substrate. Yet another embodiment of the present invention is directed to a set of inks for generating multicolored images which comprises (a) a first ink comprising water, an anionic dye, and a monoquaternary cationic penetrant of the formula

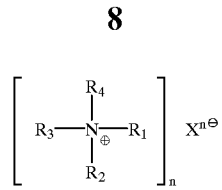

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion; and (b) a second ink comprising water and a pigment; wherein intercolor bleed between the first ink and the second ink is reduced. Still another embodiment of the present invention is directed to a process for generating multicolored images on a recording sheet which comprises (a) providing a first ink comprising water, an anionic dye, and a monoquaternary cationic penetrant of the formula

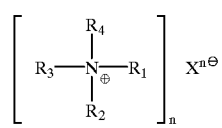

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion; (b) providing a second ink comprising water and a pigment; (c) applying the first ink to the recording sheet; and (d) applying the second ink to the recording sheet; wherein the first ink is in contact with the second ink on the recording sheet, and wherein intercolor bleed between the first ink and the second ink is reduced.

DETAILED DESCRIPTION OF THE INVENTION

The first and second inks of the present invention contain an aqueous liquid vehicle. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, tripropylene glycol monomethyl ether, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof. When mixtures of water and water soluble or miscible organic liquids are selected as the liquid vehicle, the water to organic ratio typically ranges from about 100:0 to about 30:70, and preferably from about 97:3 to about 40:60. The non-water component of the liquid vehicle generally serves as a humectant or cosolvent which has a boiling point higher than that of water (100° C.). In the ink compositions of the present invention, the liquid vehicle is typically present in an amount of from about 80 to about 99.9 percent by weight of the ink, and preferably from about 90 to about 99 percent by weight of the ink, although the amount can be outside these ranges.

The inks for the present invention also contain a colorant. The colorant for the first ink is an anionic dye, and the colorant for the second ink is a pigment. Any suitable or desired anionic dye can be employed in the first ink. Examples of suitable dyes include Food dyes such as Food Black No.1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza(18)annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Savinyl Blue GLS (Sandoz); Luxol Blue MBSN (Morton-Thiokol); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-1 75; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Clariant Corp., Charlotte, N.C., such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any desired or effective amount, typically from about 0.05 to about 15 percent by weight of the ink, preferably from about 0.1 to about 10 percent by weight of the ink, and more preferably from about 1 to about 5 percent by weight of the ink, although the amount can be outside of these ranges.

Examples of suitable pigments for the second ink of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Clariant Corp., Charlotte, N.C., Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (Clariant Corp., Charlotte, N.C.), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Clariant Corp., Charlotte, N.C.), Novoperm Yellow FG1 (Clariant Corp., Charlotte, N.C.), Permanent Yellow YE 0305 (Paul Uhlich), Lumogen Yellow D0790 (BASF), Suco-Gelb L1250 (BASF), Suco-Yellow D1355 (BASF), Hostaperm Pink E (Clariant Corp., Charlotte, N.C.), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Clariant Corp., Charlotte, N.C., including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like. Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in an amount of from about 0.1 to about 8 percent by weight of the ink, and preferably from about 2 to about 7 percent by weight of the ink, although the amount can be outside these ranges.

In one embodiment, the pigment particles are present in combination with a resin emulsion, wherein the resin emulsion acts as a dispersing agent for the pigment particles. The resin emulsion typically comprises resin particles and solubilized resin derived from the polymerization in water of an olefinic acid, such as acrylic acid or methacrylic acid, and an olefinic acrylate or methacrylate, such as methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, dodecyl methacrylate, benzyl acrylate, benzyl methacrylate, polyethyleneglycol acrylate, polyethyleneglycol methacrylate, polyoxyalkylene acrylate, polyoxyalkylene methacrylate, or the like. Typical polyoxyalkylene acrylates and methacrylates include those of the general formula

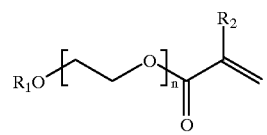

wherein R is a hydrogen atom or an alkyl group, typically with from 1 to about 6 carbon atoms, and n is a number representing the number of repeat monomer units, typically being from 2 to about 100.

The resin typically has a number average molecular weight of from about 1,000 to about 15,000 grams per mole and a weight average molecular weight of from about 1,500 to about 40,000, although the molecular weight values can be outside of these ranges. The resin particles typically have an average particle diameter of from about 30 to about 300 nanometers, although the average particle diameter can be outside of this range. The resin emulsion typically comprises from about 60 to about 99 percent by weight resin particles and from about 1 to about 40 percent by weight solubilized resin, and preferably comprises from about 90 to about 97 percent by weight resin particles and from about 3 to about 10 percent by weight solubilized resin, although the relative amounts can be outside of these ranges. Both the resin particles and the solubilized resin can be generated from a free radical type process in water, wherein one of the monomers is water soluble, such as an acrylic acid or a methacrylic acid, and the other monomer(s) exhibit low solubility in water (for example, from about 0.05 to about 2 percent by weight soluble in water), such as an alkyl acrylate or an alkyl methacrylate or a polyoxyalkylene(meth) acrylate.

The free radical initiator is generally an emulsion type initiator, such as a persulfate, like potassium or ammonium persulfate. Chain transfer agents can be used to adjust the molecular weight of the resin and to adjust the resin particle to solubilized resin ratio. Suitable chain transfer agents include alkylthiols, such as dodecanethiol, halogenated hydrocarbons, such as carbon tetrabromide, or, preferably, a combination of an alkylthiol and a halogenated hydrocarbon. Surfactants can also be incorporated into the resin emulsion, including anionic, cationic, and nonionic surfactants. Examples of suitable surfactants include sodium dodecylbenzene sulfonate, polyethylene oxide, polyethylene oxide nonyl phenyl ether, tetraalkyl ammonium chloride, sodium naphthalene sulfonate, and the like, typically present in an amount of from about 0.005 to about 20 weight percent of the resin, and preferably from about 0.1 to about 5 percent by weight of the resin, although the amount can be outside of these ranges. Generally, the olefinic acidic monomer comprises from about 5 to about 20 parts by weight of the resins, the olefinic alkyl(meth)acrylate comprises from about 40 to about 60 parts by weight of the resins, and the polyethyleneglycol methacrylate, or, more generally, a low molecular weight polyethylene glycol capped with a methacrylate or acrylate, comprises from about 0 to about 20 parts by weight of the resins. Although both the resin particles and the solubilized resin are derived from the same monomers, the monomer content may be different in the resin particles as compared to the solubilized resin; more specifically, the solubilized resin may contain a higher content of acidic monomer than the resin particles.

Further information regarding resin emulsions suitable for dispersing pigment colorants is disclosed in, for example, U.S. Pat. No. 5,766,818; copending application U.S. Ser. No. 08/869,962, filed Jun. 5, 1997, entitled "Ink Compositions," with the named inventors Guerino G. Sacripante, Garland J. Nichols, Elizabeth A. Kneisel, and Chieh-Min Cheng; copending application U.S. Ser. No. 08/828,850, filed Mar. 31, 1997, entitled "Ink Compositions," with the named inventors Garland J. Nichols, Daniel G. Marsh, and Chieh-Min Cheng; and copending application U.S. Ser. No. 08/960,754, filed Oct. 29, 1997, entitled "Surfactants," with the named inventors Nan-Xing Hu, Paul F. Smith, and Beng S. Ong; the disclosures of each of which are totally incorporated herein by reference.

The first ink of the present invention further contains a monoquaternary cationic penetrant. Suitable monoquaternary cationic penetrants are of the general formula

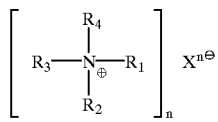

wherein $R_1$ is either a benzyl group or an alkyl group (including unsaturated alkyl groups, cyclic alkyl groups, and substituted alkyl groups, with suitable substituents including hydroxy groups, fluorine atoms (including situations wherein the entire alkyl group is perfluorinated), and the like) having at least about 3 carbon atoms, preferably from about 3 to about 30 carbon atoms, and more preferably from about 4 to about 24 carbon atoms, $R_2$, $R_3$, and $R_4$ each, independently of the others, are hydrogen atoms, methyl groups, or ethyl groups (wherein two or more R groups can be joined together to form a ring), X is an anion, such as $Cl^-$, $Br^-$, $I^-$, $HSO_4^-$, $HSO_3^-$, $SO_4^{2-}$, $SO_3^{2-}$, $CH_2SO_3^-$, $CH_3SO_3^-$, $CH_3C_6H_4SO_3^-$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, or the like, and n is an integer representing the charge on the anion, typically being 1, 2, 3, or 4. Quaternary compounds of this formula are readily commercially available, and are also easily prepared. For example, the corresponding free amines, which are readily available from, for example, Aldrich Chemical Co., Milwaukee, Wis., or Akzo Chemical Co., Chicago, Ill., can be neutralized with an acid or alkyl salt to generate the quaternary penetrant, as follows:

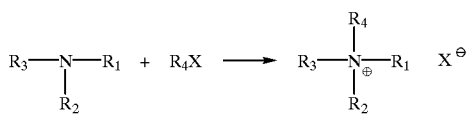

Specific examples of quaternary penetrants include cetyl pyridinium chloride, dodecyl trimethyl ammonium bromide, cetyl trimethyl ammonium bromide, butyl ammonium chloride, hexyl ammonium chloride, octyl ammonium chloride, dodecyl ammonium chloride, butyl dimethyl ammonium chloride, hexyl dimethyl ammonium chloride, octyl dimethyl ammonium chloride, dodecyl dimethyl ammonium chloride, dodecyl trimethyl ammonium chloride, hexadecyl trimethyl ammonium chloride, benzyl dimethyl ammonium chloride, cyclohexyl ammonium chloride, and the like, as well as mixtures thereof. The quaternary penetrant is present in the ink in any desired or effective amount, typically from about 1 to about 20 percent by weight of the ink, and preferably from about 5 to about 10 percent by weight of the ink, although the amount can be outside of these ranges.

While not being limited to any particular theory, one possible explanation for the advantages of the present invention is that the presence of the quaternary penetrant in the first ink does not precipitate the colorant in the second ink; rather, the quaternary penetrant in the first ink forms a barrier layer on the paper, wherein the positively charged head groups of the penetrant molecules bond with the substrate surface while the hydrophobic tail groups of the penetrant molecules project from the substrate surface; since the second ink is repelled by the tail groups of the penetrant and cannot dislodge the head groups from the paper surface, intercolor bleed is reduced or eliminated. Another possible explanation of the advantages of the present invention is that the presence of the quaternary penetrant in the first ink does not precipitate the colorant in the second ink; rather, the quaternary penetrant in the first ink enters a liquid crystalline phase (such as a lamellar liquid crystalline phase or a hexagonal liquid crystalline phase) on the substrate surface; this highly viscous liquid crystalline phase, which can achieve viscosities of from about 30 to about 40 poise in some instances, with higher viscosities being observed for longer hydrophobic tail chain lengths on the penetrant, repels the second ink from the substrate in areas printed by the first ink, thereby reducing or eliminating intercolor bleed.

The properties of the first ink can be further tailored by selecting the length of the $R_1$ alkyl chain and selecting which of the $R_2$, $R_3$, and $R_4$ groups are alkyl groups and which are hydrogen atoms. Further details regarding these properties are illustrated in Example I. In general, quaternary penetrants wherein $R_1$ has from about 8 to about 30 carbon atoms are preferred, with from about 8 to about 24 carbon atoms being more preferred, and from about 8 to about 18 carbon atoms being most preferred, and quaternary penetrants wherein $R_2$ and $R_3$ are methyl and $R_4$ is either hydrogen or methyl are most preferred for improving substrate penetration, dry time, and solubility of the penetrant in the ink. Unsaturated $R_1$ groups, such as oleyl groups, linoeyl groups, and the like, can be preferred in some instances because the unsaturated group tends to stiffen the hydrocarbon chain. Perfluorinated $R_1$ groups can also be preferred in some instances, particularly when low surface energy of the ink on the substrate is desired; in general, each $—CF_2—$ group in a chain is equivalent to about 1.5 $—CH_2—$ groups, and shorter perfluorinated $R_1$ groups, such as those with about 5 carbon atoms, can be preferred. One preferred penetrant is dimethyl octyl ammonium salts, wherein $R_1$ has 8 carbon atoms, $R_2$ and $R_3$ are methyl, and $R_4$ is hydrogen. The presence of the quaternary penetrant further enables advantages such as smooth ink jetting performance, biocidal properties (thereby eliminating the need for a separate biocide in the ink), and the like.

Other optional additives to the inks include biocides such as Dowicil 150, 200, and 75, benzoate salts, sorbate salts, and the like, present in an amount of from about 0.0001 to about 4 percent by weight of the ink, and preferably from about 0.01 to about 2.0 percent by weight of the ink, pH controlling agents such as acids or, bases, phosphate salts, carboxylates salts, sulfite salts, amine salts, and the like, present in an amount of from 0 to about 1 percent by weight of the ink and preferably from about 0.01 to about 1 percent by weight of the ink, or the like.

One example of an additive to the inks is a polymeric additive consisting of two polyalkylene oxide chains bound to a central bisphenol-A-type moiety. This additive is of the formula

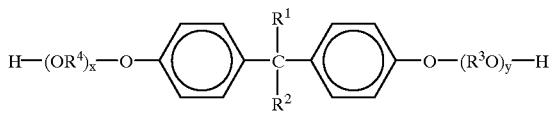

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million by weight of the ink. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

The ink compositions are generally of a viscosity suitable for use in ink jet printing processes. At room temperature (i.e., about 25° C.), typically, the ink viscosity is no more than about 10 centipoise, and preferably is from about 1 to about 5 centipoise, more preferably from about 1 to about 4 centipoise, although the viscosity can be outside this range, particularly for applications such as acoustic ink jet printing.

Ink compositions of the present invention can be of any suitable or desired pH. For some embodiments, such as thermal ink jet printing processes, typical pH values are from about 3 to about 11, preferably from about 5 to about 10, and more preferably from about 6 to about 8.5, although the pH can be outside of these ranges.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

Preferably, the first ink is applied to the recording sheet first, followed by applying the second ink to the recording sheet so that at least some of the second ink is in contact with the first ink on the recording sheet, thereby reducing or eliminating intercolor bleed. Preferably, the first ink is lighter in color than the second ink; for example, in one embodiment, the first ink is yellow, magenta, or cyan, and the second ink is black.

The present invention is also directed to a process which entails incorporating the ink of the present invention into an ink jet printing apparatus and causing droplets of the ink to be ejected in an imagewise pattern onto a recording sheet. In one preferred embodiment, the printing apparatus employs a thermal ink jet process wherein the ink in the nozzles is selectively heated in an imagewise pattern, thereby causing droplets of the ink to be ejected in imagewise pattern. In another preferred embodiment, the printing apparatus employs an acoustic ink jet process, wherein droplets of the ink are caused to be ejected in imagewise pattern by acoustic beams. Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions were prepared by simple mixing of the following ingredients. The quaternary penetrant for each ink was the chloride salt and was as indicated in the table below. The inks thus formulated were hand coated onto Xerox® 10 Series Smooth paper (paper 1) and Xerox® Image Series Smooth paper (paper 2) with a #7 Meier rod. The table below indicates drying times in seconds on papers 1 and 2 for each of the indicated penetrants.

| Ingredient | Supplier | Amount (grams) |
|---|---|---|
| DOWICIL 150/200 | Dow Chemical Co. | 1.466 |
| polyethylene oxide* | Polysciences | 0.733 |
| imidazole | BASF | 14.66 |
| EDTA | Dow Chemical Co. | 0.9529 |
| sulfolane** | Phillips Petroleum | 219.9 |
| acetylethanolamine | Scher Chemical Co. | 175.92 |
| PROJET YELLOW OAM*** | Zeneca Colors | 586.4 |
| | roll mill until dissolved | |
| quaternary penetrant | Aldrich Chemical Co. | 100 |
| deionized water | — | 317.85 |

*bisphenol-A derivative, molecular weight 18,500, of the formula

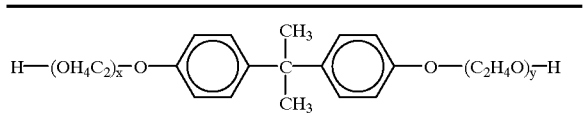
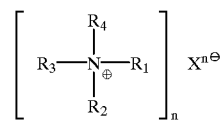

**containing 95 wt. % sulfolane and 5 wt. % water
***aqueous solution containing 7.5 wt. % Acid Yellow 23 dye

| $R_1$ | $R_2$ | $R_3$ | $R_4$ | paper 1 | paper 2 | notes |
|---|---|---|---|---|---|---|
| $C_4H_9$ | H | H | H | 8 | 11 | uneven drying |
| $C_6H_{13}$ | H | H | H | 2 | 3 | 10 wt. % not totally soluble |
| $C_8H_{17}$ | H | H | H | <1 | <1 | 10 wt. % not totally soluble |
| $C_{12}H_{25}$ | H | H | H | <1 | <1 | 10 wt. % not totally soluble |
| cyclo-hexyl | H | H | H | 12 | 15 | — |
| $C_4H_9$ | $CH_3$ | $CH_3$ | H | 9 | 12 | — |
| $C_6H_{13}$ | $CH_3$ | $CH_3$ | H | 2 | 5 | — |
| $C_8H_{17}$ | $CH_3$ | $CH_3$ | H | <1 | <1 | — |
| $C_{12}H_{25}$ | $CH_3$ | $CH_3$ | H | <1 | <1 | 10 wt. % not totally soluble; 5 wt. % soluble |
| benzyl | $CH_3$ | $CH_3$ | H | ~1 | — | 10 wt. % not totally soluble; 1.5 wt. % soluble |
| $C_{12}H_{25}$ | $CH_3$ | $CH_3$ | $CH_3$ | ~1 | 1 | — |
| $C_{16}H_{33}$ | $CH_3$ | $CH_3$ | $CH_3$ | ~1 | 1 | — |

In general, dry times decreased with increasing $R_1$ alkyl chain length. For the penetrants wherein $R_2$, $R_3$, and $R_4$ were hydrogen, drying was slow and uneven for the butyl salt; dry times plateaued at about 1 second for $R_1$ alkyl chain lengths greater than about 6 or 7 carbon atoms, while solubility decreased and surface tensions remained in the 30s (dynes per centimeter). The inks wherein $R_2$ and $R_3$ were methyl and $R_4$ was either hydrogen or methyl appeared to be preferred with respect to drying times and solubility; for those wherein $R_4$ was hydrogen, similar dry times were observed to those wherein $R_2$, $R_3$, and $R_4$ were hydrogen, and solubility was improved; for those wherein $R_4$ was methyl, solubility was further improved. The cyclohexyl salt behaved similarly to its butyl counterpart.

Additional ink compositions were made containing dimethyl octyl ammonium chloride ($R_1$=$C_8H_{17}$, $R_2$ and $R_3$=$CH_3$, $R_4$=H) by simple mixing of the above ingredients, but containing additional deionized water and the dimethyl octyl ammonium chloride in the amounts given in the table below. Drying times in seconds on paper 1 and paper 2 were as follows:

| grams penetrant | grams additional water | paper 1 | paper 2 |
|---|---|---|---|
| 10 | 90 | 5 | 7–8 |
| 20 | 80 | 2–3 | 4–5 |
| 50 | 50 | ~1 | ~1 |
| 100 | 0 | <1 | <1 |

Drying times decreased rapidly with increasing penetrant concentration, and reached a virtual plateau between 5 and 10 weight percent penetrant.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, an anionic dye, and a monoquaternary cationic penetrant of the formula wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper.

2. An ink composition according to claim 1 wherein $R_1$ is an alkyl group having from about 3 to about 30 carbon atoms.

3. An ink composition according to claim 1 wherein $R_1$ is an alkyl group having from about 4 to about 24 carbon atoms.

4. An ink composition according to claim 1 wherein $R_1$ is an alkyl group having at least about 8 carbon atoms.

5. An ink composition according to claim 4 wherein $R_1$ has no more than about 30 carbon atoms.

6. An ink composition according to claim 4 wherein $R_1$ has no more than about 24 carbon atoms.

7. An ink composition according to claim 4 wherein $R_1$ has no more than about 18 carbon atoms.

8. An ink composition according to claim 1 wherein $R_2$ and $R_3$ are both methyl groups and $R_4$ is a hydrogen atom.

9. An ink composition according to claim 1 wherein $R_2$, $R_3$, and $R_4$ are all methyl groups.

10. An ink composition according to claim 1 wherein the quaternary penetrant is selected from the group consisting of cetyl pyridinium salts, dodecyl trimethyl ammonium salts, cetyl trimethyl ammonium salts, butyl ammonium salts, hexyl ammonium salts, octyl ammonium salts, dodecyl ammonium salts, butyl dimethyl ammonium salts, hexyl dimethyl ammonium salts, octyl dimethyl ammonium salts, dodecyl dimethyl ammonium salts, hexadecyl trimethyl ammonium salts, benzyl dimethyl ammonium salts, cyclohexyl ammonium salts, and mixtures thereof.

11. An ink composition according to claim 1 wherein the quaternary penetrant is selected from the group consisting of octyl ammonium salts, dodecyl ammonium salts, octyl dimethyl ammonium salts, dodecyl dimethyl ammonium salts, benzyl dimethyl ammonium salts, dodecyl trimethyl ammonium salts, hexadecyl trimethyl ammonium salts, and mixtures thereof.

12. An ink composition according to claim 1 wherein the quaternary penetrant is an octyl dimethyl ammonium halide.

13. An ink composition according to claim 1 wherein the quaternary penetrant is present in the ink in an amount of from about 5 to about 10 percent by weight of the ink.

14. An ink composition according to claim 1 wherein at least one of $R_2$, $R_3$, and $R_4$ is a hydrogen atom.

15. An ink composition according to claim 1 wherein $R_1$ is a benzyl group.

16. An ink composition according to claim 1 wherein $R_1$ is an alkyl group with from about 8 to about 18 carbon atoms.

17. An ink composition according to claim 1 wherein $R_1$ is an unsaturated alkyl group.

18. An ink composition according to claim 1 wherein $R_1$ is a perfluorinated alkyl group.

19. A process which comprises applying an ink composition according to claim 1 to a plain paper substrate, wherein the ink exhibits rapid penetration of the substrate.

20. A process according to claim 19 wherein the ink is applied to the substrate by incorporating the ink composition into an ink jet printing apparatus and causing droplets of the ink composition to be ejected in an imagewise pattern onto the substrate.

21. A process according to claim 20 wherein the printing apparatus employs a thermal ink jet process wherein the ink in the nozzles is selectively heated in an imagewise pattern, thereby causing droplets of the ink to be ejected in imagewise pattern.

22. A process which comprises applying an ink composition to a plain paper substrate an ink composition which comprises water, an anionic dye, and a monoquaternary cationic penetrant of the formula

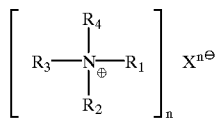

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration of the substrate, wherein the ink is applied to the substrate by incorporating the ink composition into an ink jet printing apparatus and causing droplets of the ink composition to be ejected in an imagewise pattern onto the substrate, and wherein the printing apparatus employs an acoustic ink jet process wherein droplets of the ink are caused to be ejected in imagewise pattern by acoustic beams.

23. A set of inks for generating multicolored images which comprises (a) a first ink which comprises water, an anionic dye, and a monoquaternary cationic penetrant of the formula

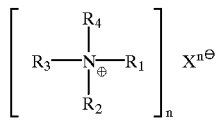

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper; and (b) a second ink comprising water and a pigment; wherein intercolor bleed between the first ink and the second ink is reduced.

24. A process for generating multicolored images on a recording sheet which comprises (a) providing a first ink which comprises water, an anionic dye, and a monoquaternary cationic penetrant of the formula

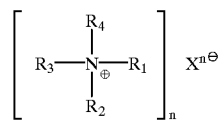

wherein $R_1$ is either a benzyl group or an alkyl group having at least about 3 carbon atoms, $R_2$, $R_3$, and $R_4$ each, independently of the others, are hydrogen atoms, methyl groups, or ethyl groups, wherein two or more R groups can be joined together to form a ring, X is an anion, and n is an integer representing the charge on the anion, wherein the ink exhibits rapid penetration when applied to plain paper; (b) providing a second ink comprising water and a pigment; (c) applying the first ink to the recording sheet, and (d) applying the second ink to the recording sheet; wherein the first ink is in contact with the second ink on the recording sheet, and wherein intercolor bleed between the first ink and the second ink is reduced.

25. A process according to claim 24 wherein the printing apparatus employs a thermal ink jet process wherein the ink in the nozzles is selectively heated in an imagewise pattern, thereby causing droplets of the ink to be ejected in imagewise pattern.

26. A process according to claim 24 wherein the printing apparatus employs an acoustic ink jet process wherein droplets of the ink are caused to be ejected in imagewise pattern by acoustic beams.

* * * * *